United States Patent [19]

Kawasaki et al.

[11] Patent Number: 5,426,742
[45] Date of Patent: * Jun. 20, 1995

[54] MICROPROCESSOR FOR SUPPLYING BRANCH CONDITION INDICATING SIGNAL IN RESPONSE TO EXECUTION OF CONDITIONAL BRANCH INSTRUCTION

[75] Inventors: Shumpei Kawasaki, Tokyo; Koichi Nakano, Kodaira, both of Japan

[73] Assignee: Hitachi, Ltd., Tokyo, Japan

[ * ] Notice: The portion of the term of this patent subsequent to Aug. 20, 2008 has been disclaimed.

[21] Appl. No.: 957,394

[22] Filed: Oct. 7, 1992

Related U.S. Application Data

[63] Continuation of Ser. No. 727,091, Jul. 9, 1991, Pat. No. 5,165,033, which is a continuation of Ser. No. 565,195, Aug. 9, 1990, Pat. No. 5,041,969, which is a continuation of Ser. No. 634,075, Jul. 25, 1984, abandoned.

[30] Foreign Application Priority Data

Jul. 25, 1983 [JP] Japan ................ 58-134317

[51] Int. Cl.⁶ .............................. G06F 9/30
[52] U.S. Cl. ..................... 395/375; 364/DIG. 1; 364/732.8; 364/244.6; 364/261.5
[58] Field of Search ................ 395/375, 725; 364/DIG. 1 MS File, DIG. 2 MS File

[56] References Cited

U.S. PATENT DOCUMENTS

| | | | |
|---|---|---|---|
| 3,631,405 | 12/1971 | Hoff et al. | 364/DIG. 1 |
| 3,651,482 | 3/1972 | Benson et al. | 366/DIG. 1 |
| 4,099,236 | 7/1978 | Goodman et al. | 364/DIG. 1 |
| 4,149,243 | 4/1979 | Wallis | 364/DIG. 1 |
| 4,171,537 | 10/1979 | Weissberger et al. | 364/DIG. 1 |
| 4,225,921 | 9/1980 | Hartley et al. | 364/DIG. 1 |
| 4,270,167 | 5/1981 | Koehler et al. | 364/DIG. 1 |
| 4,349,873 | 9/1982 | Gunter et al. | 364/DIG. 1 |
| 4,390,966 | 6/1983 | Kawashima et al. | 364/DIG. 2 |
| 4,438,492 | 3/1984 | Harman, Jr. et al. | 364/DIG. 1 |
| 4,467,412 | 8/1984 | Hoff | 364/DIG. 1 |
| 4,509,116 | 4/1985 | Lachey et al. | 364/DIG. 1 |
| 4,547,849 | 10/1985 | Lowe et al. | 364/DIG.1 |
| 4,573,118 | 2/1986 | Damouny et al. | 364/DIG. 1 |
| 4,750,110 | 6/1988 | Mothersole et al. | 364/DIG. 1 |
| 5,021,991 | 6/1991 | MacGregor et al. | 364/DIG. 2 |
| 5,041,969 | 8/1991 | Kawasaki et al. | 364/DIG. 1 |
| 5,165,033 | 11/1992 | Kawasaki et al. | 364/DIG. 1 |

FOREIGN PATENT DOCUMENTS

| | | |
|---|---|---|
| 51-6436 | 1/1976 | Japan . |
| 52-43333 | 4/1977 | Japan . |
| 54-35654 | 3/1979 | Japan . |
| 57-212541 | 12/1982 | Japan . |

OTHER PUBLICATIONS

"Component Data Catalog", Intel Corp., Santa Clara, Calif. Jan. 1981, pp. 7-1 to 7-24.
"An Architectural Contrast, the M6800 Microprocessor Family, and the 8086/i APX", Motorola, Inc., Nov. 1983.
"MC 68020 32-bit MI/PR User Manual", Motorola, 1984 pp. 8-1 to 8-38.

*Primary Examiner*—Thomas M. Heckler
*Attorney, Agent, or Firm*—Antonelli, Terry, Stout & Kraus

[57] ABSTRACT

A data processor includes first and second microprocessors. The first microprocessor is provided with an external terminal and is additionally fed with an instruction for checking whether a signal fed to that external terminal satisfies a predetermined condition or not thereby to instruct a branching operation if the predetermined condition is satisfied. As a result, the external status of the first microprocessor can be checked. The second microprocessor is provided with an external terminal and is additionally fed with an instruction for checking whether or not the internal status of the second microprocessor satisfies a predetermined condition and supplies the result of the checking operation to the outside of the second microprocessor through the external terminal. As a result the internal status of the second microprocessor can be judged from the outside. The second microprocessor is assigned an arithmetic function. The external terminals attached to the first and second processors are connected to each other. The result of the arithmetic operation conducted in the second microprocessor is fed through the external terminal to the external terminal of the first microprocessor so that the processings including the arithmetic operations can be executed at a high speed.

7 Claims, 8 Drawing Sheets

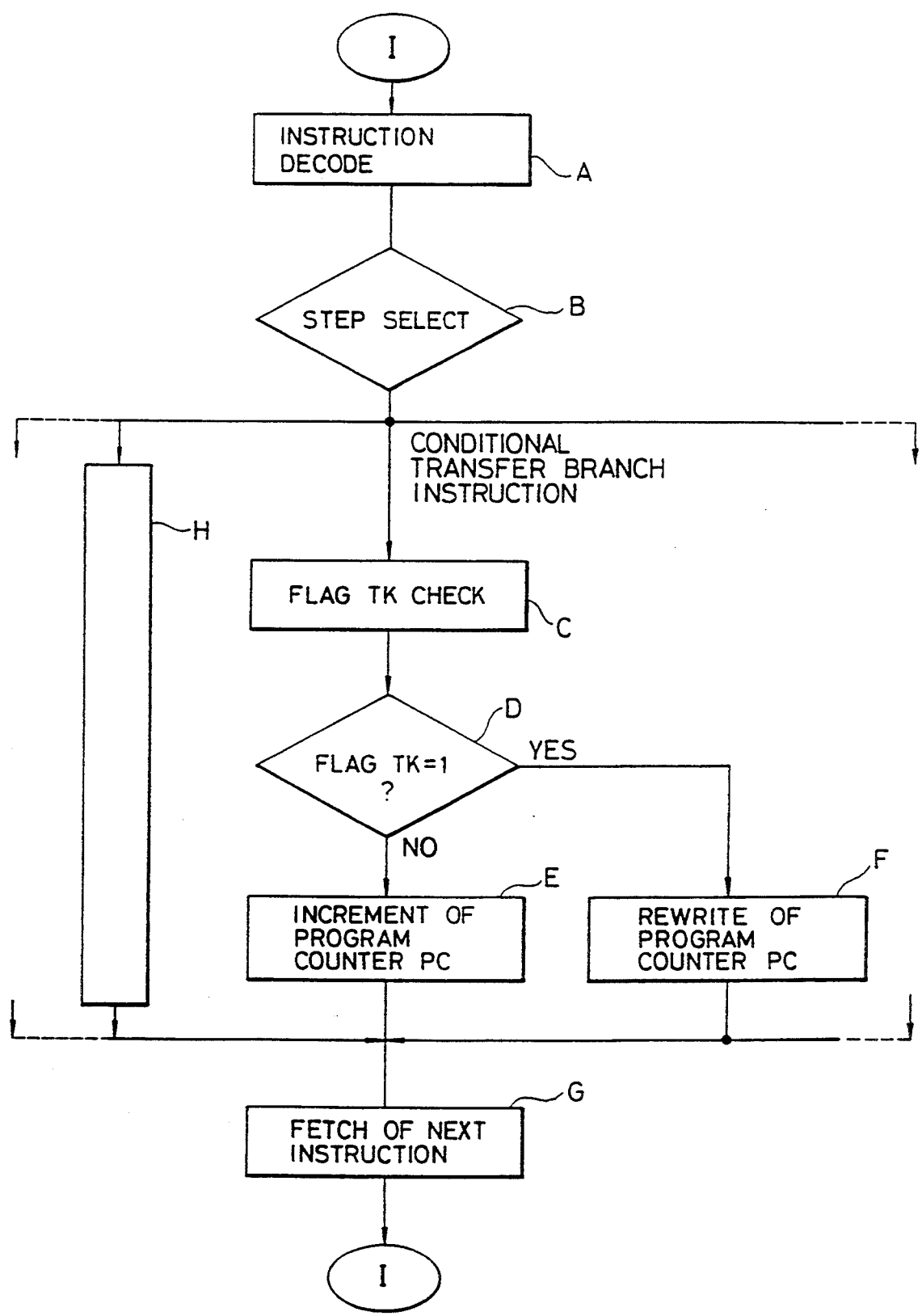

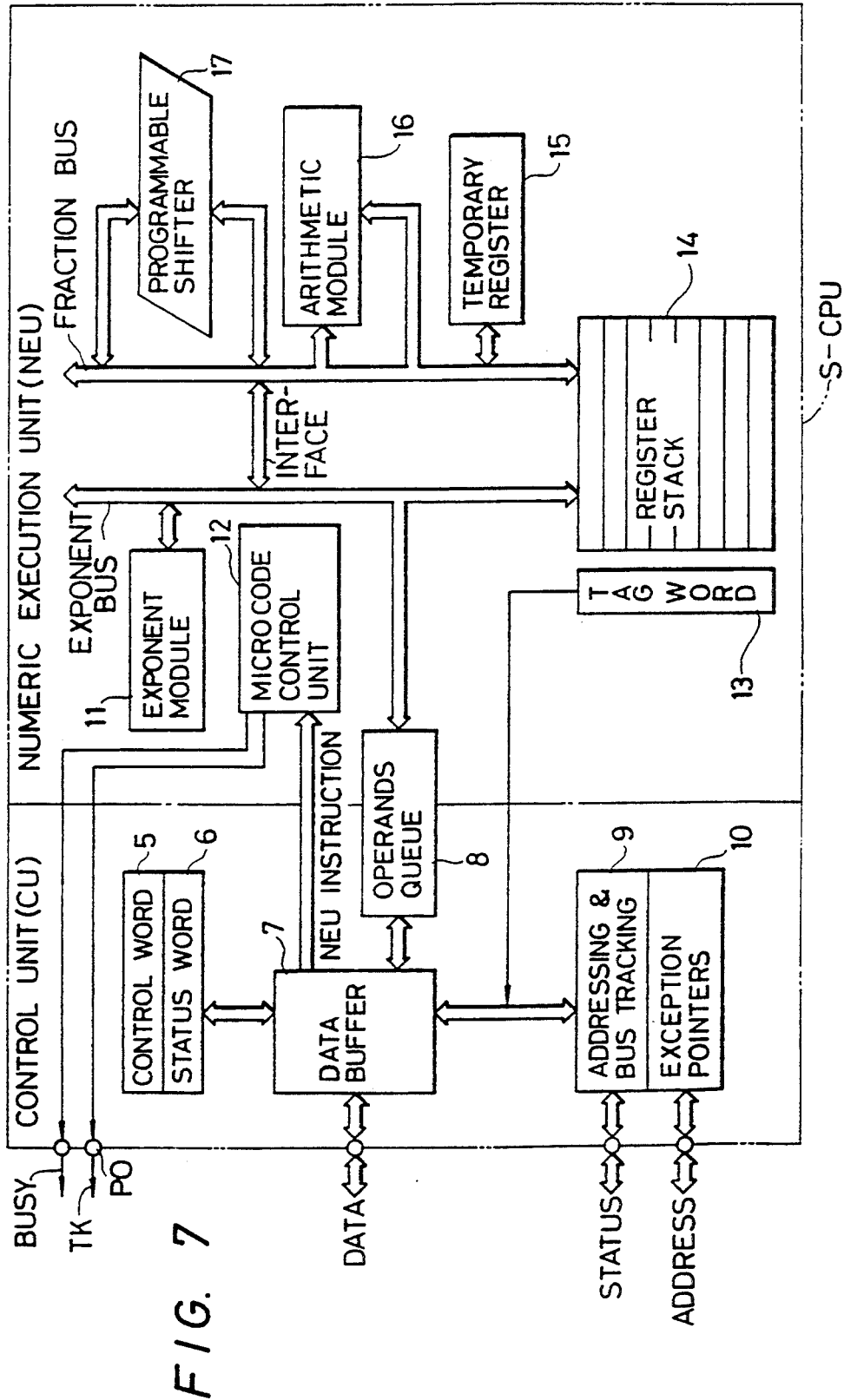

MICROPROCESSOR FOR SUPPLYING BRANCH CONDITION INDICATING SIGNAL IN RESPONSE TO EXECUTION OF CONDITIONAL BRANCH INSTRUCTION

This application is a continuation of application Ser. No. 727,901, filed Jul. 9, 1991, now U.S. Pat. No. 5,165,033, which is a continuation of application Ser. No. 565,195, filed Aug. 9, 1990, now U.S. Pat. No. 5,041,969, issued Aug. 20, 1991, which is a continuation of application Ser. No. 634,075, filed Jul. 25, 1984, now abandoned.

BACKGROUND OF THE INVENTION

The present invention relates to a microprocessor and a data processor using the former, and more particularly, to a technique which is effective when it is applied to a data processor including a plurality of microprocessors, for example.

A well known prior art microprocessor is the Intel Type 8086 which is disclosed in the "IAPX86 Family—User's Manual" published by INTEL Japan Co., Ltd. on Aug. 20, 1981.

The microprocessor Type 8086 can be used to form a data processor having a relatively high processing capacity if it is combined with another microprocessor Type 8087 which is also disclosed in the above-referenced Publication. In other words, a data processor is formed in such a way that the two kinds of microprocessors perform parallel processing operations. In this case, the microprocessor Type 8086 serves as the master processor, whereas the microprocessor Type 8087 operates as a slave processor, or a numeric processor extension. In this case, the slave processor takes exclusive charge of floating-point arithmetic.

If that data processor is caused to execute data processing so as to change the processing to be conducted in accordance with the result of the floating-point arithmetic, the following problems are encountered, as determined by the investigations conducted by the present inventors.

This data processing is executed in accordance with the following steps, as will be described hereinafter. Specifically, floating-point arithmetic is performed by the slave processor 8087, and the status data expressing the result is written in a RAM (Random Access Memory). Next the master processor 8086 fetches the status data from the RAM into its registers and determines the processing to be executed in accordance with the status data.

Because the number of steps to be followed becomes relatively large, there arise the following problems: (1) the number of steps in the program is increased, and so the program becomes complicated; (2) the time period required for the processing is elongated in accordance with the increase in the number of steps in the program; and (3) the region of the RAM for storing the program is enlarged with the increase in the number of steps in the program.

SUMMARY OF THE INVENTION

An object of the present invention is to provide a microprocessor which is intended to improve its data processing function by a simple construction.

Another object of the present invention is to provide a data processor which has a high throughput.

The above and other objects and various novel features of the present invention will become more apparent from the following description taken with reference to the accompanying drawings.

BRIEF DESCRIPTION OF THE DRAWINGS

FIG. 3 is a flow chart for explaining the operations of the microprocessor shown in FIG. 1;

FIG. 6 is a block diagram showing the construction of flag registers of the microprocessor shown in FIG. 5;

FIG. 7 is a block diagram showing still another embodiment of the microprocessor to which the present invention is applied;

DESCRIPTION OF THE PREFERRED EMBODIMENTS

Figure 1:
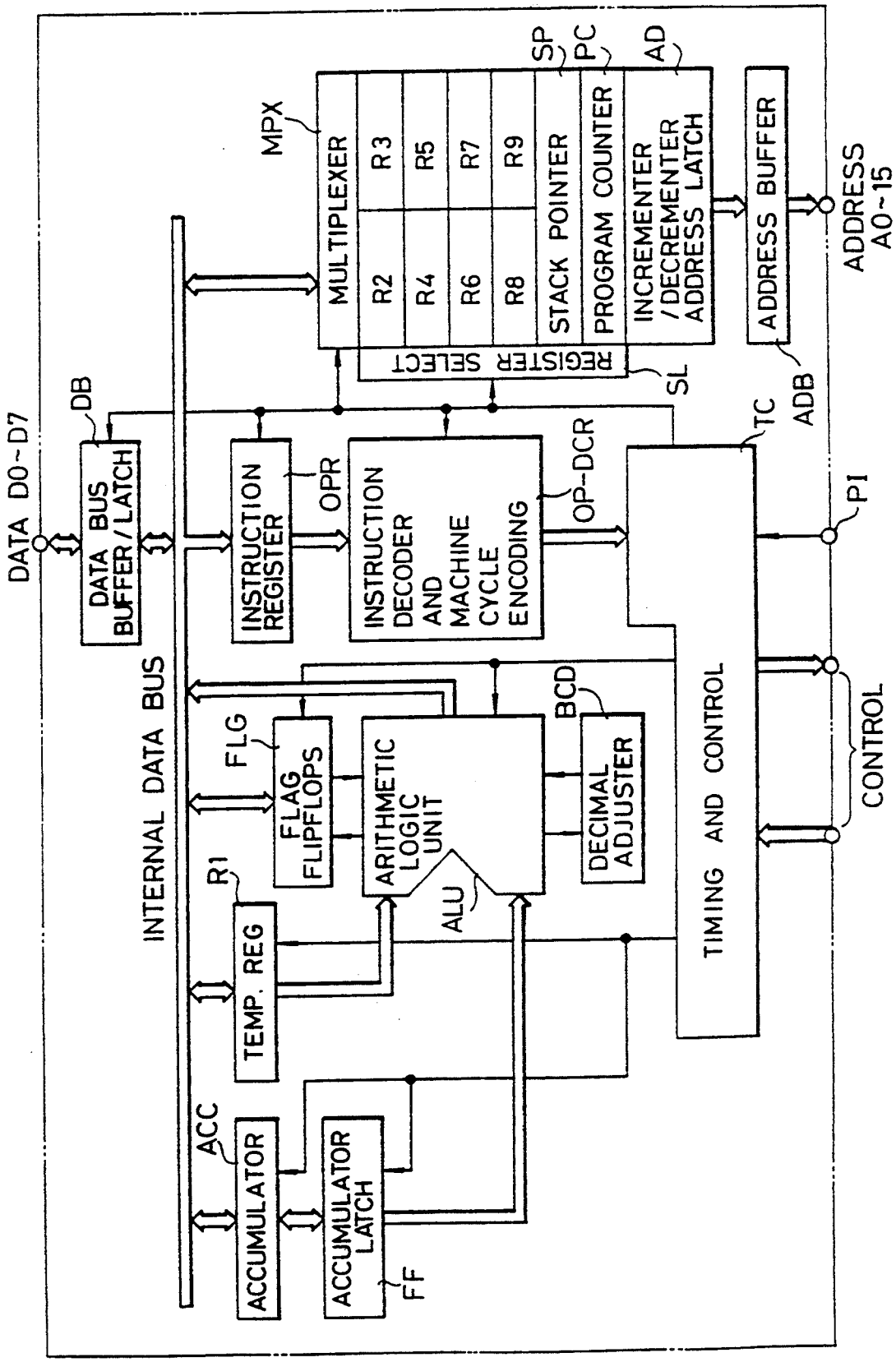
FIG. 1 is a block diagram showing one embodiment of a microprocessor to which the present invention is applied.

FIG. 1 is a block diagram showing a central processing unit (which will be referred to as a microprocessor) forming a microcomputer system.

In FIG. 1, each circuit block enclosed by broken lines may be formed on a single substrate of a semiconductor, such as silicon, by the well-known technique of fabricating a semiconductor integrated circuit, although this is not essential to the invention. As an example, the microprocessor of the present embodiment may be an 8-bit microprocessor capable of generating 16-bit logic address signals, although this also is not essential to the present invention.

An 8-bit microprocessor for generating 16-bit logic address signals is well known in the art, which microprocessor is composed of an arithmetic logic unit, an accumulator, an accumulator latch, a temporary register, a flag flip-flop, a decimal adjuster, an instruction register, an instruction decoder and machine cycle encoder, a timer and controller, a general purpose working register and temporary register, a stack pointer, a program counter, an incrementer/decrementer address latch, a register selector, a multiplexer, an address buffer and so on.

The microprocessor according to the present embodiment is functionally constructed of an arithmetic unit, a control unit and a register unit. Specifically, the arithmetic unit is made operative to perform arithmetic and logic operations and is composed of an arithmetic logic unit ALU, an accumulator ACC, an accumulator latch FF, a temporary register R1, flag flip-flops FLG, and a decimal adjuster BGD.

The control unit is made operative to control the operations of the microprocessor and is composed of an instruction register OPR, an instruction decoder and machine cycle encoder OP-DCR, and a timer and controller TC.

The register unit has the function of an internal memory in the microprocessor and is composed of general purpose working registers and temporary registers R2 to R9, a stack pointer SP, a program counter PC, an incrementer/decrementer address latch AD, a register selector SL, and a multiplexer MPX. The logic address signals A0 to A15 generated by the address latch are outputted through an address buffer ADB.

In the present embodiment, although not a limitation on the invention, the individual components of the arithmetic unit, i.e., the arthimetic logic unit ALU, the accumulator AGC, the accumulator latch FF, the temporary register R1 and the decimal adjuster BCD are made to have the same constructions as those corresponding components of the well-known microprocessor. In the present embodiment, moreover, the individual components of the register unit, i.e., the general purpose working registers and the temporary registers R2 to R9, the stack pointer SP, the program counter PC, the incrementer/decrementer and address latch AD, the register selector SL and the multiplexer MPX are made to have the same constructions as those corresponding components of the well-known microprocessor. Still moreover, the instruction register OPR is made to have the same construction as the well-known instruction register.

In order to improve the processing function of the microprocessor, in the present embodiment, the flag flip-flops FLG, are improved over the corresponding component of the well-known microprocessor, and the microprocessor of the present embodiment is newly provided with a terminal PI which is to be fed with a signal. Thanks to these improvements, a novel data processing function not available in the well-known microprocessor is added to the microprocessor of the present embodiment.

Figure 2:
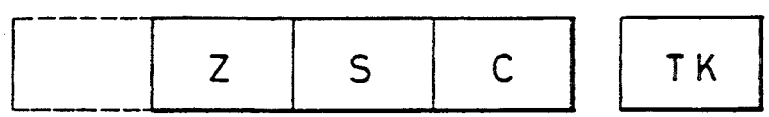
FIG. 2 is a block diagram showing a flag register FLG shown in FIG. 1.

The flag flip-flops (or flag registers) FLG are provided not only in the form of the well-known flag flip-flops but also with a memory circuit (or flip-flop) TK which has its content determined in accordance with the signal fed to the terminal PI. The construction of that flag register FLG will be described in detail in the following with reference to FIG. 2. FIG. 2 shows the construction of the flag register FLG.

The flag register FLG is composed of a plurality of memory circuits for storing a variety of flags, e.g., a plurality of flip-flops. FIG. 2 shows some of the plural memory circuits as representatives. Indicated at capital letter C is a memory circuit for storing a carry flag C indicating the carry from the highest bit by the arithmetic and logic operations of the microprocessor CPU. Indicated at letter Z is a memory circuit for storing a zero flag Z which is set in case the result of each operation is zero. Indicated at letter S is a memory circuit for storing a sign flag S indicating the sign of the result of each operation. The individual memory circuits for the respective flags thus far described are made to have the same constructions as those of the memory circuits of the well-known microprocessor.

In the present embodiment, the memory circuit TK is provided in addition to the above memory circuits for the individual flags. The content of that memory circuit TK is determined in accordance with the level of the signal which is fed to the terminal PI. In the microprocessor of the present embodiment, the processing operations conducted in accordance with the content of that memory circuit TK are branched. Therefore, it can be assumed that the memory circuit TK stores a conditional transfer branch flag.

The microprocessor of the present embodiment has not only the instructions possessed by the well-known microprocessor, but also a so-called "conditional transfer branch instruction" for changing the processing operations in accordance with the value of the conditional transfer branch flag.

The operations of the added conditional transfer branch instructions will be described in detail in the following with reference to FIG. 3.

Incidentally, in the present embodiment and the embodiments to be described in the following, the power supply terminals to be supplied with supply voltages are omitted.

FIG. 3 is a flow chart for explaining the operations of the microprocessor CPU.

The instruction fetched to the microprocessor CPU from memory (not shown) is decoded at a step A. The operation is shifted (at a step B) to a step according to the content of the instruction which has been decoded to select one step from a plurality of steps. For example, if the content of the decoded instruction is merely to increment the value of the program counter PC, the step H is then executed. At this step H, the value of the program counter PC is incremented.

The following processings are executed in case the instruction decoded at the step A is the conditional transfer branch instruction for determining the processing to be executed in accordance with the stored content of the memory circuit TK, i.e., the value of the conditional transfer branch flag TK.

At a step C, more specifically, the stored content of the memory circuit TK, i.e., the value of the conditional transfer branch flag TK is checked. In case the condition is satisfied as a result of the check, the processing is shifted at a step D to the data processing operation for the condition met. In case the condition is not satisfied, on the other hand, the processing is shifted at the step D to the data processing operation for the condition unsatisfied. For example, in case the value of the conditional transfer branch flag TK is set at "1" (i.e., the value "1" of the binary signal), the condition is satisfied, and a step F is then executed. At this step F, the value of the program counter PC is rewritten. As a result, the instruction designated by the rewritten value of the program counter PC is fetched (at a step G). In other words, the instruction stored in an address of the memory which has been designated by the address signal generated by the program counter PC is fetched. As a result, the data processing operations for the condition met are then performed. In case the value of the conditional transfer branch flag TK is set at the "0" level of the binary signal, on the other hand, a step E is then executed judging that the condition is not satisfied. At this step E, the value of the program counter PC is incremented by a predetermined number. Then, the instruction, which is designated by the incremented value of the program counter PC, is fetched (at the step G). As a result, the data processing operations for the condition unsatisfied are then conducted. The instruction fetched at the step G is decoded again at the step A. The processing operations similar to the aforementioned ones are subsequently executed.

The above-specified conditional transfer branch instruction may contain, the address signal which is to be rewritten at the step F in the program counter PC. In such case, the value of the program counter PC is rewritten at the step F to the value of the address signal which forms a part of the above-specified conditional transfer branch instruction.

Whether the value of the conditional transfer branch flag TK, i.e., the content stored in the memory circuit TK is set at the "1" or "0" level of the binary signal is determined by the potential of the signal which is fed to the signal terminal PI. By combining the signal terminal PI and the above-specified conditional transfer branch instruction, therefore, a variety of such data processing operations which are not available in the well-known microprocessor can be executed, as will be explained with reference to FIG. 4.

In the description thus far made, it is assumed that the condition is satisfied when the value of the conditional transfer branch flag TK is set at "1". However, the present invention can be modified such that the condition is satisfied to effect the branching operation when the conditional transfer branch flag TK is set at the "0" level of the binary signal as well.

Figure 4:
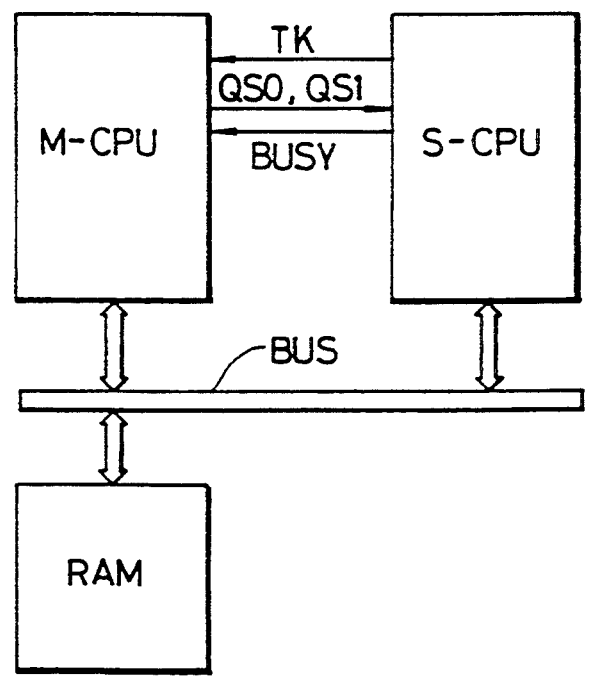
FIG. 4 is a block diagram showing one embodiment of a data processor to which the present invention is applied.

FIG. 4 is a block diagram showing one embodiment of the data processor to which the present invention is applied.

Indicated at M-CPU in FIG. 4 is a master processor which is constructed of a microprocessor of the type to be explained later with reference to FIG. 5. Indicated at S-CPU is a slave processor (or coprocessor) which maybe constructed of a microprocessor having a special data processing function, e.g., a floating-point arithmetic function, of the type not possessed by the master processor M-CPU. One embodiment of the microprocessor forming such a slave processor will be described later with reference to FIG. 7.

In FIG. 4, a memory RAM is provided to store data, programs and so on. The individual address terminals of the master processor M-CPU, the individual address terminals of the slave processor S-CPU, and the individual address terminals of the memory RAM are linked through an external address bus, and the individual data terminals of the master processor M-CPU, the individual data terminals of the slave processor S-CPU, and the individual data terminals of the memory RAM are also linked through an external data bus. In FIG. 4, the external address bus and the external data bus are drawn as a single bus BUS so as to simplify the illustration.

The two processors M-CPU and S-CPU are made operative to output a plurality of signals and to input a plurality of signals. On the other hand, a control signal, such as a write enable signal is fed to the memory RAM. In order to simplify the drawing, however, only the signals necessary for explaining the present invention are shown in the drawing to be used hereinafter.

Indicated at characters QS0 and OS1 in FIG. 4 are queue status signals which are fed from the master processor M-CPU to the slave processor S-CPU. The master processor M-CPU and slave processor S-CPU operate in synchronism with each other in response to those queue status signals OS0 and OS1. When the master processor M-CPU fetches an instruction forming part of the program stored in the memory RAM or the like, the slave processor S-CPU fetches the same instruction in synchronism with the fetching operation of the master processor M-CPU. In synchronism with the decoding operation of the fetched instruction by the master processor M-CPU, moreover, the slave processor S-CPU decodes the fetched instruction. In other words, the processing operation of the slave processor S-CPU is conducted under the control of the master processor M-CPU, and the two processors M-CPU and S-CPU respectively fetch the instructions which are stored in the memory RAM in parallel with each other and decode their fetched instructions.

Each of the two processors M-CPU and S-CPU decodes its instruction thereby to conduct the processing operation according to its fetched instruction, if this fetched instruction is an assigned one, as will be described hereinafter. If the instruction is not an assigned one, on the other hand, each of the two processors M-CPU and S-CPU ignores its fetched instruction. In other words, when the master processor M-CPU fetches an instruction other than that concerning floating-point arithmetic, it executes the fetched instruction. In this case, the slave processor S-CPU ignores its fetched instruction. On the other hand, the master processor M-CPU ignores an instruction involving floating-point arithmetic; whereas, the slave processor S-GPU executes this type of instruction. In these ways, the processings are shared between the master processor M-CPU and the slave processor S-GPU. As a result, while the slave processor S-CPU is conducting a floating-point arithmetic operation, the master processor M-CPU can sequentially fetch instructions and execute its assigned instructions. Thus, it is possible to provide a data processor which has a high processing speed.

Indicated at BUSY in FIG. 4 is a busy signal which is used to inform the master processor M-CPU of the fact that the slave processor S-CPU is conducting its arithmetic operation.

In the present embodiment, although it will be described in detail hereinafter, the task branch signal TK is fed from the slave processor S-CPU to the master processor M-CPU. The level of that task branch signal is determined in dependence upon whether the internal status of the slave processor S-CPU is suitable for a specified condition or not. An instruction for the branching operation is additionally fed to the master processor M-CPU when the level of the task branch signal TK fed is found to be at a predetermined level by the check. As a result, the processing capacity of the data processor is improved.

The master processor M-CPU will be described in the following with reference to FIG. 5. Each of the blocks enclosed by double-dotted lines in FIG. 5 is formed, although not essentially, in a single semiconductor substrate of silicon by the well-known technique of fabricating a seimconductor integrated circuit.

One example of the master processor, which is functionally composed of an instruction queue buffer 1, a bus control unit BUS CONT, an instruction pointer IP, an address adder $\Sigma$, four segment registers CS-ES, a flag register 2, an arithmetic logic circuit, a temporary register 3, a control circuit 4 and a plurality of registers, is the microprocessor Type "8086" disclosed in the "IPAX Family—User's Manual" published by INTEL Japan Co., Ltd. on Aug. 20, 1981.

Figure 5:
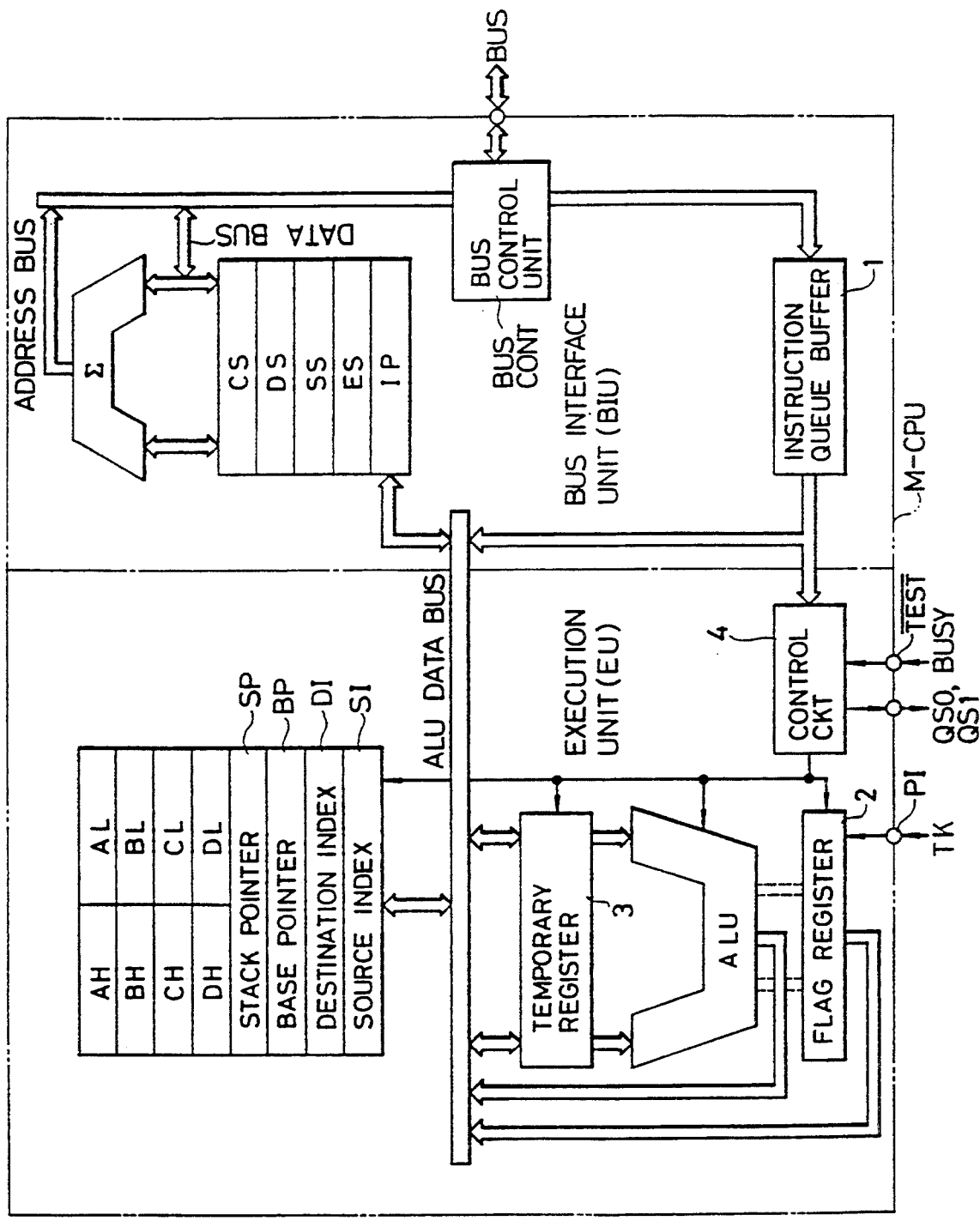
FIG. 5 is a block diagram showing another embodiment of the microprocessor to which the present invention is applied.

The master processor M-CPU shown in FIG. 5 is functionally constructed of a bus interface unit BIP, which interfaces with external memories, and an execution unit EU for executing instructions on the basis of the instructions and data read out. The bus interface unit BIU and execution unit EU are made to operate separately of and in parallel with each other so as to increase the processing speed.

The bus interface unit BIU is functionally composed of an instruction queue buffer 1, a bus control unit BUS CONT, and instruction pointer IP, an address adder Σ, and four segment registers CS, SS, DS and ES. The queue buffer 1 makes the above parallel operations possible and acts as a RAM operating as a FIFO (first-in/first-out) store. The instruction queue buffer 1 prefetches the instructions up to plural bytes from the external memories independently of the operations of the execution unit EU. An address signal for fetching the instructions is generated by the instruction pointer IP, the four kinds of segment registers CS, SS, DS and ES and the address adder Σ. In other words, the operations similar to those of the typical program counter PC are conducted by the above-specified circuits.

The execution unit EU is functionally composed of a flag register 2, an arithmetic logic unit ALU, a temporary register 3, a control circuit 4 and a plurality of registers. These plural registers are composed of an accumulator A (which is composed of registers AH and AL), a base register B (registers BH and BL) for mainly conducting the extension of the accumulator A and an auxiliary operation, register C (registers CH and CL) to be used mainly for a counter-like purpose, a register D (registers DH and DL) to be used mainly for the data, a stack pointer register SP, a source index register SI, a base pointer register BP and a destination index register DI. Moreover, the register SP acts as a pointer for designating a memory location for return address storage upon a subroutine call or an interrupt request, and the registers SI and DI act as a source index (for designating source data) and a destination index (for destination) when in a string operation.

In the master processor M-CPU of the present embodiment, the individual components of the bus interface unit BIU, i.e., the instruction queue buffer 1, the bus control circuit BUS CONT, the instruction pointer IP, the address adder Σ and the four segment registers CS, SS, DS and ES are made to have the same constructions as those corresponding components of the well-known master processor. In the present embodiment, moreover, the individual components of the execution unit EU, i.e., the arithmetic logic unit ALU, the temporary register 3 and the plural registers are also made to have the same constructions as those corresponding components of the well-known master processor.

The microprocessor of the present embodiment is provided with the external terminal PI so as to improve the processing function. Moreover, the flag register 2 is improved over the well-known flag register of the known processor.

The flag register 2 is provided with the memory circuit TK, which has its content determined by the task branch signal TK fed through the external terminal PI, in addition to the plural memory circuits forming the well-known flag registers. The individual memory circuits forming the flag register are constructed of flip-flops, for example. The construction of that flag register 2 is shown in FIG. 6.

In FIG. 6, there are shown several of the memory circuits for the various flags, which are provided in the prior art, and the memory circuit TK which is provided according to the present invention. Specifically, letters CF indicate a memory circuit for storing a carry flag GF similar to the carry flag C of FIG. 2. Letters ZF indicate a memory circuit for storing a zero flag similar to the zero flag Z. Letters IF indicate a memory circuit for storing an interrupt enable flag IF. Letters TF indicate a memory circuit for storing a trap flag for bringing the processor into a single step state. The present embodiment is further provided with the memory circuit TK for storing the conditional transfer branch flag TK, in addition to the memory circuits for the above flags. That memory circuit TK has its status set in accordance with the task branch signal TK which is fed through the signal terminal PI attached to the master processor M-CPU. In accordance with the potential of the task branch signal TK, specifically, the memory circuit TK stores the binary signal "1" or "0". In other words, the value of the conditional transfer branch flag TK may be set at "1" or "0" in accordance with the potential of the task branch signal TK.

By the new provision of that conditional transfer branch flag TK, the added instruction is substantially to the conditional transfer branch instruction, which has been explained with reference to FIG. 3, and will be explained in detail with reference to FIG. 10(A) together with the operation of the slave processor S-CPU, which is not described now but will be described later.

In FIG. 5, there is shown only a terminal $\overline{\text{TEST}}$ which is made receptive of the queue status signals QS0 and QS1 and the busy signal BUSY of those control signals. Like the well-known bus control circuit, moreover, the bus control unit BUS-GONT is made operative to output various control signals and to input various control signals, but those control signals are omitted in FIG. 5. That bus control unit BUS-CONT is made similar to the well-known bus control unit to output address signals and to input and output data. These address signals and the data are shown together in FIG. 5.

The slave processor S-CPU will be explained in the following. FIG. 7 shows the functional blocks of the slave processor S-CPU. Each of the blocks enclosed by broken lines in FIG. 7 may be formed on a single semiconductor substrate of silicon by the well-known technique of fabricating the semiconductor integrated circuit.

The processor, which is functionally composed of a control word register, a status word register, a data buffer, an addressing and bus tracking circuit, an exception pointer, an exponent module, a microcode control unit, a tag word register, a register stack, a temporary register, an arithmetic module, a programmable shifter and an operands queue, is disclosed as the slave processor Type 8087 which in the "IAPX86 Family—User's Manual" published by INTEL Japan Co., Ltd. on Aug. 20, 1981.

The slave processor S-CPU shown in FIG. 7 is functionally constructed of a control unit GU and a numeric execution unit NEU.

The control unit CU is functionally composed of a control word register 5, a status word register 6, a data buffer 7, an addressing & bus tracking circuit 9 and an exception pointer 10. On the other hand, the numeric execution unit NEU is functionally composed of an exponent module 11, a microcode control unit 12, a tag word register 13, a register stack 14, a temporary register 15, an arithmetic module 16 and a programmable shifter 17. Moreover, numeral 8 indicates an operands queue.

In the processor of the present embodiment, the individual components of the control unit CU, i.e. , the control word register 5, the data buffer 7, the addressing & bus tracking circuit 9 and the exception pointer 10 are made to have the same constructions as those corresponding components of the well-known processor. In the processor under consideration, moreover, the individual components of the numeric execution unit NEU, i.e., the exponent module 11, the register stack 14, the temporary register 15, the arithmetic module 16 and the programmable shifter 17 are made to have the same constructions as those corresponding components of the well-known processor. Likewise, the operands queue 8 is made to have the same construction as that of the operands queue of the well-known processor.

In order to improve the processing speed and to more effectively use the memory, the processor of the present embodiment is newly provided with an external terminal PO. This external terminal PO is fed with the task branch signal TK which is generated by the microcode control unit 12.

Figure 8:
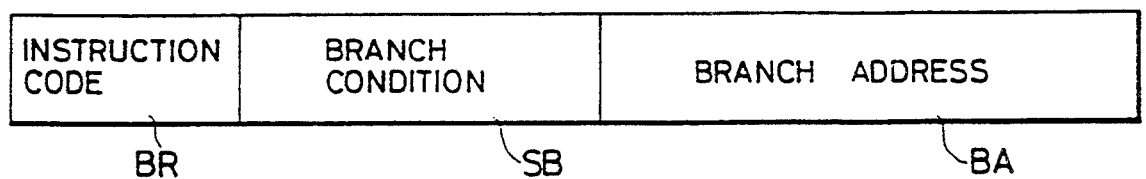
FIG. 8 is a block diagram for explaining the construction of an instruction word.
Figure 9:
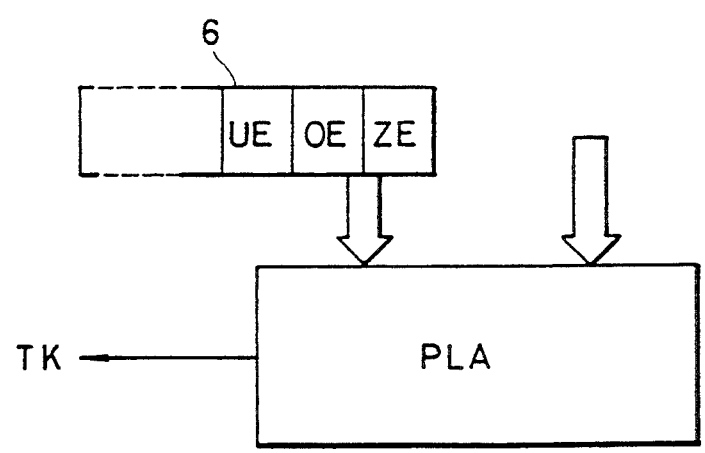
FIG. 9 is a block diagram for explaining the construction of the microprocessor shown in FIG. 7.

An essential portion of the microcode control unit 12 is shown in FIG. 9. The conditional transfer branch instruction added according to the present invention is so constructed as is shown in FIG. 8, although it will be described in detail hereinafter. Provided in the microcode control unit 12 is a programmable logic array PLA which is constructed such that it generates the task branch signal TK at a high (or low) level when the content of a branch condition SP and the content of the status word has a predetermined relationship, e.g., becomes consistent, and the task branch signal TK is set at a low (or high) level when the two contents become inconsistent.

More specifically, the status word register 6 is composed of a plurality of memory circuits, e.g., flip-flops for storing a variety of condition codes. These various condition codes express the internal status of the slave processor at that time. As shown in FIG. 9, the memory circuits are shown to include a memory circuit UE for storing an underflow code UE, a memory circuit OE for storing an overflow code, and a memory circuit ZE for storing a zero detection code ZE. The programmable logic array PLA is in the microcode control unit 12 is made operative to generate the task branch signal TK at a high (or low) level when the binary signal pattern outputted from the status word register 6 and composed of the condition codes and the binary signal pattern forming the branch condition SB take a predetermined relationship, e.g., become coincident, and the task branch signal TK is set at a low (or high) level when the two binary signal patterns become inconsistent. In other words, the task branch signal TK at the high (or low) level is generated in case the internal status of the slave processor S-CPU, which is expressed at that time by the status word in the register 6, becomes coincident with the branch condition.

The programmable logic array PLA generates a variety of timing signals, in addition to the task branch signals TK. For example, the busy signal BUSY is generated by the ROM like the well-known processor. This busy signal BUSY is held at the high level while the slave processor S-CPU is executing an instruction. As a result, that busy signal BUSY is also held at the high level while the special conditional transfer branch instruction is being executed. When no instruction is under execution, moreover, that busy signal BUSY is held at the low level.

Like the well-known processor, a variety of status signals are outputted from the addressing & bus tracking circuit 9. Moreover, the various status signals from the outside are fed to the addressing & bus tracking circuit 9. For example, the queue status signals (QS0 and (QS1 are fed to the addressing & bus tracking circuit 9 like the well-known processor.

FIG. 8 shows the construction of one example of the conditional transfer branch instruction which is added in accordance with the present invention. This conditional transfer branch instruction is fetched by the slave processor S-CPU and master processor M-GPU. This conditional transfer branch instruction is one for causing the two processors to execute such operations as will be described in the following.

In this conditional transfer branch instruction, more specifically, in case the content of the branch condition SB and the content of the status word in the register 6 of the slave processor S-GPU become coincident, i.e., in case the condition is satisfied (or in case the internal status of the slave processor S-CPU at that time suits the branch condition), the master processor M-CPU generates the address signals in accordance with the content of a branch address BA. A next instruction is read out from the address of the memory, which is designated by the generated address signals. The instruction thus read out is fetched to the master processor M-CPU and slave processor S-CPU and is executed.

On the other hand, in case the content of the branch condition SB and the content of the status word in the register 6 of the slave processor S-CPU are not coincident, i.e., in case the condition is not satisfied (or in case the internal status of the slave processor S-CPU at that time does not suit the branch condition), the master processor M-CPU generates address signals which designate the address immediately following the address in the memory at which that instruction is stored. As a result, the next instruction is fetched. This instruction thus read out is fetched by both the master processor M-CPU and slave processor S-CPU and is executed by the processor assigned to that type of instruction.

Further, the designation BR appearing in FIG. 8 indicates an instruction code which is composed of the binary signal pattern expressing the kind of instruction. In this instruction, the content of the instruction code BR is made to have a predetermined binary signal pattern expressing the predetermined conditional transfer branch instruction.

The content of the branch condition SB is used mainly in the slave processor S-CPU, and the content of the branch address BA is used mainly in the master processor M-CPU, as will be explained hereinafter with reference to FIG. 10.

Figure 10:
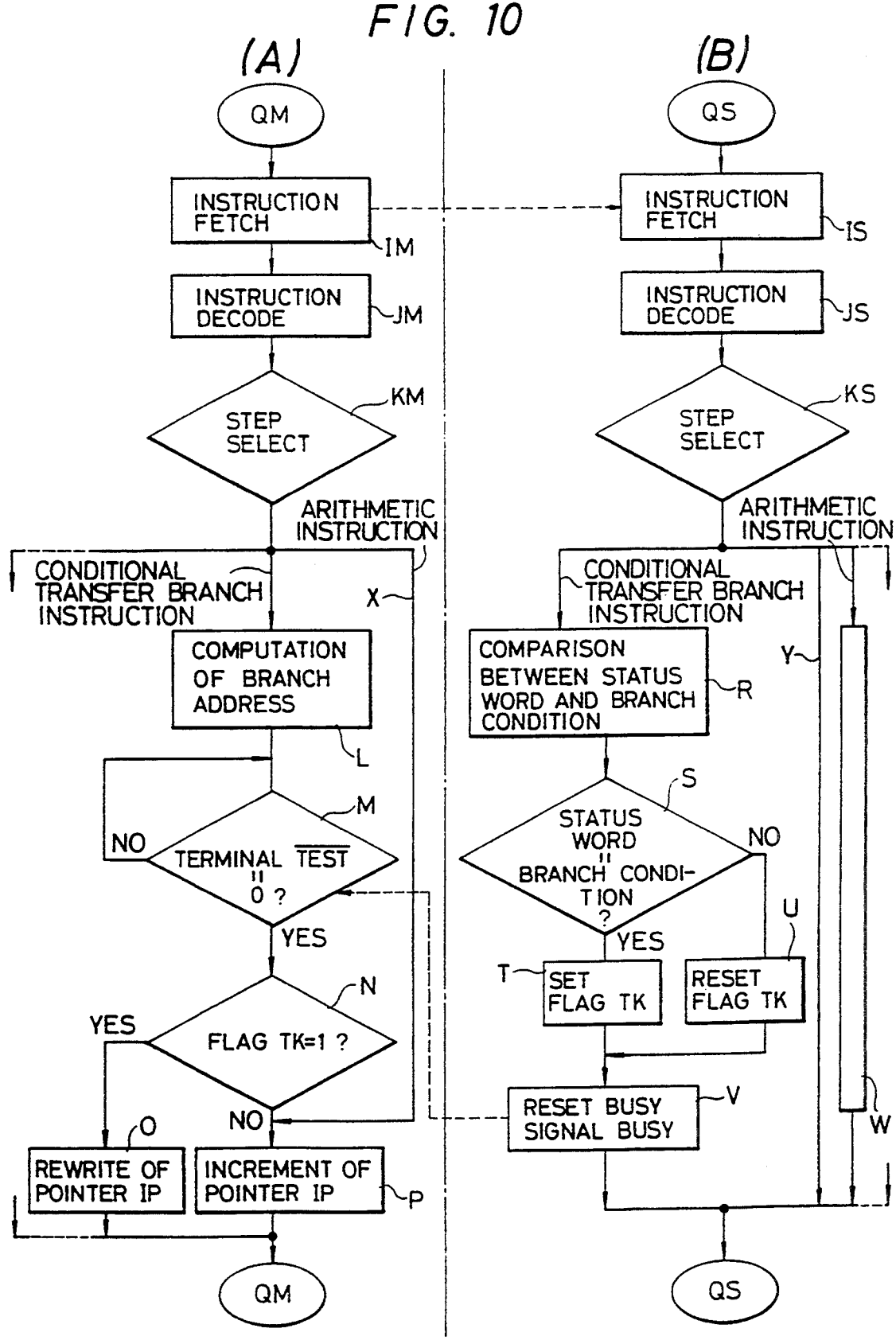
FIG. 10, consisting of (A) and (B), is a flow chart for explaining the operations of the microprocessors shown in FIGS. 5 and 7.

Turning to FIG. 10, the operations of the master processor M-CPU and slave processor S-CPU will be explained in the following. Specifically, FIG. 10(A) is a flow chart showing the operation in the master processor M-CPU, and FIG. 10(B) is a flow chart showing the operation in the slave processor S-CPU.

First of all, address signals are outputted from the master processor M-CPU. As a result, an instruction is read out from the address of the memory RAM, which is designated by those address signals. The instruction thus read out is taken at a step IM by the master processor M-CPU. In short, the instruction is fetched. At this time this instruction is also fetched to the slave processor S-CPU (at a step IS). The instructions thus fetched are decoded by the individual processors M-CPU and S-CPU (at steps JM and JS).

In the master processor M-CPU, a step necessary for executing the decoded instruction is selected from the plural steps in view of the result of the instruction decoding at the step JM (at a step KM). Likewise, in the slave processor S-CPU, a step necessary for executing the decoded instruction is selected from the plural steps in view of the result of the instruction decoding at the step JS (at a step KS).

In case the instruction is an arithmetic instruction concerning a floating-point arithmetic operation, the master processor M-CPU selects a step X at the step KM. Then, the processing of the step X is subsequently conducted. Specifically, the master processor M-CPU ignores the fetched instruction. In the slave processor S-CPU, at this time, it is judged at the step KS that the instruction calls for an arithmetic operation, and a step W necessary for executing this arithmetic instruction is selected. The processing of the step W thus selected is then conducted. In other words, the arithmetic instruction is executed at the step W.

On the other hand, in case the instruction is one concerning the master processor M-CPU, e.g., a bit operating instruction, a step (not shown) corresponding to that instruction is selected in the master processor M-CPU (at the step KM). The processing of the step selected is then conducted, As a result, a bit operation is performed. In the slave processor S-CPU, at this time, a step Y is selected so that the processing of the step Y is performed. In other words, the slave processor S-CPU ignores the fetched instruction.

In case the instruction is a special conditional transfer branch instruction having the construction shown in FIG. 8, it is judged in the master processor M-GPU at the step KM that the instruction is the special conditional transfer branch instruction, so that a step L necessary for executing that special conditional transfer branch instruction is selected. Then, this selected step L is executed. In the slave processor S-CPU, too, it is judged at the step KS that the instruction is the special conditional transfer branch instruction, so that a step R necessary for executing that special conditional transfer branch instruction is selected. Then, the selcted step R is executed.

In the slave processor S-GPU, more specifically, the content of the branch condition SB forming that instruction and the content of the status word in the register 6 are compared (at the step R). In other words, as described in conjunction with FIG. 9, the content of the branch condition SB is compared with the status of the slave processor S-CPU at that time, which is expressed by the content of the status word in the register 6. In case the branch condition and the internal status of the slave processor S-CPU at that time becomes coincident (i.e., in case the condition is satisfied), a step T is executed in the slave processor S-CPU. Specifically, the task branch signal TK is set at the binary signal level "1". In other words, the potential of the task branch signal TK is set at the high level. On the other hand, in case the branch condition and the status of the slave processor S-CPU at that time becomes non-coinicident (i.e. in case the condition is not satisfied), a step U is executed in the slave processor S-CPU. Specifically, the task branch TK is reset at the binary signal level "0". In other words, the potential of the task branch signal TK is reset to the low level. In the slave processor S-CPU, then, a step V is executed to inform the master processor M-CPU of the fact that the value of the task branch TK is determined. In other words, the busy signal BUSY is reset from the high level to the low level and is sent out to the master processor M-CPU.

In the master processor M-CPU, on the other hand, although not essentially, in case the condition is satisfied in the slave processor S-CPU, address signals for designating the address of the memory RAM, which is stored with an instruction to be executed, are computed (at the step L). In other words, the addresses, which are stored with the instruction to be executed when the condition is satisfied, are determined on the basis of the destination addresses forming a part of the instruction. Then, the master processor M-CPU is on stand-by at a step M until the busy signal BUSY at the low level is sent out from the slave processor S-CPU to the external terminal $\overline{\text{TEST}}$. When the busy signal BUSY at the low level is sent out from the slave processor S-CPU, a step N is executed in the master processor M-CPU. In other words, it is checked whether the value of the conditional transfer branch flag TK stored in the memory circuit TK is "1" or "0". Incidentally, the stored content of that memory circuit TK is a binary signal which corresponds to the binary signal of the task branch signal TK sent through the task branch signal line. For example, if the value the generated task branch signal is at the binary signal "1" (i.e., at the high level), the memory circuit TK stores the binary signal "1", and the value of the conditional transfer branch flag TK is the binary signal level "1". If the value of the task branch signal TK is at the binary signal level "1". (i.e., at the low level), on the other hand, the memory circuit TK stores the binary signal level "0", and the value of the conditional transfer branch flag TK is the binary signal level "0".

If the check of the conditional transfer branch flag TK at the step N has revealed that the value of the conditional transfer branch flag TK is the binary signal level "1", a step O is executed assuming that the condition of the instruction is satisfied. If the value of the conditional transfer branch flag TK is the binary signal level "0", on the other hand, then a step P is executed assuming that the condition of the instruction is not satisfied.

At the step O, the value of the instruction pointer IP is rewritten to a value according to the address value determined in advance at the step L. In other words, the value of the program counter is set at the address value according to the destination address of the instruction. At the step P, on the other hand, the instruction pointer IP is incremented so as to fetch a subsequent instruction from the memory RAM at a following address at which that instruction is stored. In other words, the program counter is incremented.

After that, an instruction is read out from the address of the memory RAM, which is designated by the address signals according to the address signals written in the instruction point IP in the master processor M-CPU. The instruction thus read out is fetched again to the master processor M-CPU and slave processor S-CPU at the steps IM and IS. Subsequently, the processings similar to the aforementioned ones are repeated.

In case the condition is satisfied, as has been described in the above, the stored program is executed from the address of the memory RAM, which is designated indirectly or directly by the instruction pointer IP having its value rewritten at the step 0. In case the condition is not satisfied contrary to the above, the stored program is executed from the address of the memory RAM, which is designated indirectly or directly by the instruction pointer IP incremented at the step P.

As is now understood from the description thus far made, the branch condition forming the conditional transfer branch instruction is used mainly in the slave processor S-CPU, whereas the destination address is used mainly in the master processor M-CPU. Further, the instruction code is used for the identification of the instruction in master and slave processors.

Next, the operations involving the case in which the square root of a certain number X is to be extracted by the data processor shown in FIG. 4, although not a limitation, will be described in the following.

Figure 11:
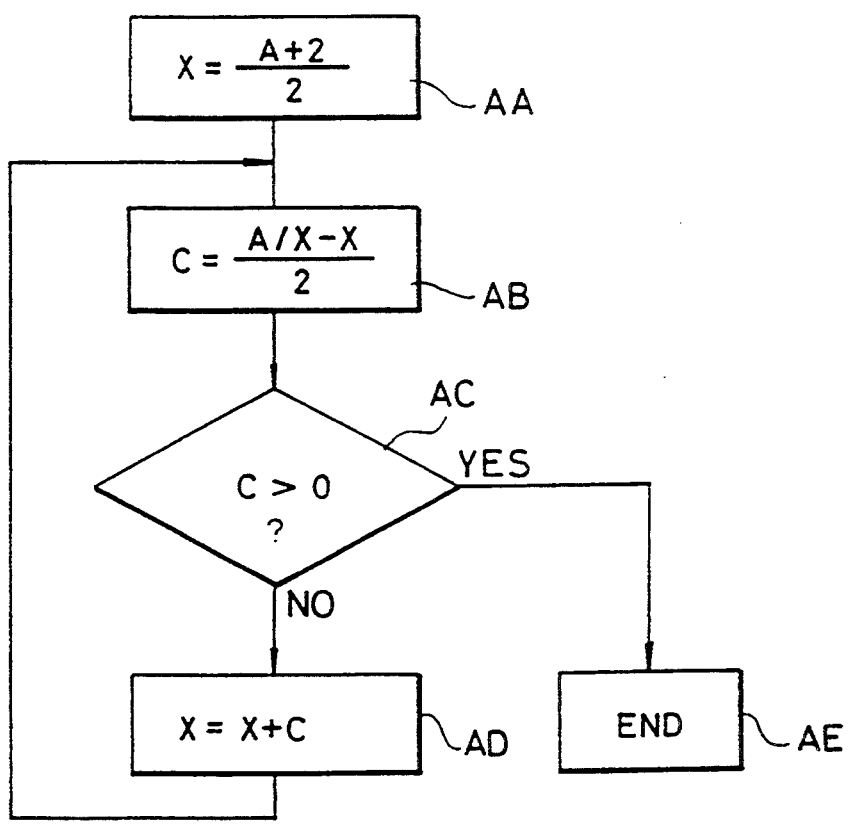
FIG. 11 is a flow chart for explaining the operations of the microprocessors shown in FIGS. 5 and 7.

FIG. 11 is a flow chart showing the operations involving extraction of the square root of the number X.

In this example, the floating-point arithmetic operation of $X=(A+2)/2$ is performed at a step AA by the slave processor S-CPU. Next the floating-point arithmetic operation of $C=(A/X-X)/2$ is also performed at a step AB by the slave processor S-CPU. The stored contents of the individual memory circuits forming the status word register 6 express the internal status of the slave processor S-CPU which is established by the operation conducted at that step AB. As a result, whether the value of the variable C becomes larger than zero or not as a result of the operation at the step AB can be known by checking the stored contents of the individual memory circuits forming the status word register 6.

In order that the task branch signal TK at the high level (i.e., at the binary signal "1") may be outputted from the PLA shown in FIG. 9 when the value of the variable C exceeds zero, therefore, the special conditional transfer branch instruction, which possesses both the binary signal pattern suitable for the output signal of the status word register 6 at that time as the branch condition and address signals for indirectly designating the address of the memory RAM at which is stored the program for executing the processing of a later-described step AE, is prepared and is executed at a subsequent step AC.

Consequently, if the step AC is executed after the variable C exceeds zero as a result of the operation at the step AB, the memory circuit TK in the master processor M-CPU stores the binary signal level "1". Then, assuming that the condition is satisifed, the master processor M-CPU executes the processing of the step AE, e.g., the processing indicating that the operation of extracting the square root of the certain number X has been finished. In case the branch condition is not satisfied as a result of the operation of the step AB, on the other hand, the task branch signal TK at the low level ("0") is sent from the slave processor S-CPU to the master processor M-CPU. Consequently, the memory circuit TK stores the conditional transfer branch flag TK of the binary signal level "0". As a result, the master processor M-CPU designates the address of the subsequent instruction and executes it, as shown in FIG. 10. In this example, the slave processor S-CPU executes a step AD of conducting the operation of $X=X+C$. After that, the step AB is executed again, and the processings described above are then repeated.

Thus, whether the branch condition of the conditional transfer branch instruction is satisfied or not is instantly transmitted through the signal line TK from the slave processor S-CPU to the master processor M-CPU so that the processing can be speeded up.

Thus, the value of the variable C determined at the step AB and the value of the variable X determined at the step AD are stored in the register stack 14 of the slave processor S-CPU, for example, like the case of the data processor using the well-known processors.

In the microprocessor shown in FIG. 1, the flag register FLG is newly provided with the memory circuit TK for storing the conditional transfer branch flag TK. Without the provision of the memory circuit TK, however, the potential of the signal terminal PI may be checked in the special conditional transfer branch instruction.

In this case, whether the potential of the external terminal PI is at the high level ("1") or at the low level ("0") is checked at the step C, as shown in FIG. 3. For example, assuming that the condition is satisfied as indicated by the high level ("1"), the step F is then executed. Assuming that the condition is not satisfied as indicated by the low level ("0"), the step E is then executed. Then it becomes unnecessary to additionally provide the flag register FLG with the memory circuit TK for storing the conditional transfer branch flag TK so that the microprocessor can be highly integrated.

In the microprocessor of FIG. 5, the master processor M-CPU is newly provided with the register (or the memory circuit) for storing the conditional transfer branch flag TK. However, a similar flag register may be attached to the slave processor S-CPU, i.e., to the output terminal of the programmable logic array PLA shown in FIG. 9. Specifically, the slave processor S-CPU may be provided with the register which is to be stored with the task branch signal TK outputted from the programmable logic array PLA. In this case, in the operations shown in FIG. 10, the task branch signal TK is set from that programmable logic array A at the step T or U. Thus, the master processor M-CPU may or may not be provided with the register for storing the conditional transfer branch flag TK. This makes it possible to highly integrate the master processor.

The following effects can be obtained according to the present invention as described hereinbefore.

The microprocessor is newly provided with the signal terminal and is additionally fed with the special conditional transfer branch instruction for effecting the conditional branch in accordance with the potential at that signal terminal. Thus, there can be attained an effect that the status outside of the microprocessor is monitored by using that special conditional transfer branch instruction to instantly conduct the data processing according to the external status. This function is convenient because a variety of data processings requiring urgent operations for a predetermined status can be executed at a high speed.

The microprocessor is newly provided with the terminal and is additionally fed with the conditional instruction for checking whether the internal status of the microprocessor is a predetermined one or not. When that condition is (or is not) satisfied, the microprocessor is made operative to transmit the condition to the outside through the terminal thereof. There can be attained another effect that the internal status of the microprocessor can be checked from the outside in response to the added instruction. This function is convenient because it can easily inform the intermediate status, in which the microprocessor is processing the data, to the outside.

The data processor is constructed of the first microprocessor (e.g., the master processor), the second microprocessor (e.g., the slave processor), and the memory. The first microprocessor is additionally fed with the special conditional transfer branch instruction for conducting the conditional branching operation in response to the signal fed to the predetermined signal terminal. On the other hand, the second microprocessor is additionally fed with a special conditional instruction for checking whether the internal status thereof is suitable for a certain condition, and is made operative to output a signal to the predetermined signal terminal of the first microprocessor from a predetermined signal terminal when that condition is (or is not) satisfied. In case the processing accompanied by the branching conditional instruction, e.g., the floating-point arithmetic, is to be performed when the internal status of the second microprocessor does (or does not) come into a certain condition, it may be sufficient that the second processor generates the aforementioned signal, whereas the first processor conducts the conditional branching operation in response to the signal fed thereto. This makes it unnecessary to exchange the data (e.g., the status data) among the slave processor, the master processor and the memory, as is different from the system of the prior art. As a result, the program for exchanging data can be eliminated to provide an effect that the memory capacity for storing the program can be accordingly reduced. Incidentally, the number of program steps can be remarkably reduced to about one quarter of the prior art system. As a result, there can be attained an effect that the memory efficiency can be improved.

Moreover, the data exchange conducted in the prior art among the processors and the memory is not required to provide an effect that the data processor can speed up its processing operation. In other words, the master processor is enabled by adding the instruction to operate as if it had the function possessed by the slave processor, e.g., the floating-point arithmetic function. Incidentally, the processing time period may be shortened to as much as one quarter of that of the prior art system.

The present invention conceived by us has been specifically described hereinbefore in connection with preferred embodiments thereof. However, the present invention should not be limited to the above embodiments but can naturally be modified in various ways without departing from the gist thereof.

In the foregoing embodiments, the description has been made such that the branching processings are conducted when the condition is satisfied. However, the branching processings may be conducted when the condition is not satisfied. Moreover, the specific construction of the microprocessor (i.e., the master processor and/or the slave processor) may take a variety of modifications. On the other hand, an undefined memory circuit of those forming the flag register of the prior art may be used as the memory circuit TK. In the foregoing embodiments, the description has been made assuming that the condition is satisfied when the conditional transfer branch flag TK is at the value "1". However, the condition may be satisfied if the flag TK takes the value "0".

According to the present invention, the microprocessor is provided with the terminal PI and is additionally fed with the instruction concerning that terminal PI. The function, which is achieved by the terminal PI and the added instruction, is different from the interrupting function of the prior art. In the interrupting function of the prior art, the interruption is conducted when the interrupt signal at the predetermined level is fed. In the present invention, on the contrary, the branching operation is not executed so long as the level of the signal fed to the terminal PI does not take the level which is designated by the added instruction. Moreover, the address to be branched can be easily changed, as is different from the interrupting operation of the prior art. Moreover, the interruption operation calls for storing the contents of the program counter and the various internal registers in the addresses, which are designated by the stack register, when the interruption occurs, so that the processing speed is dropped along a waste of use of the memory. In the functions achieved by the present invention, on the other hand, the contents of the program counter and the various registers are not saved so that the processing speed can be accelerated.

In other words, the functions achieved by the present invention are the highly responsive branching functions of judging the special condition, which have been impossible in the interrupting functions of the prior art, and can be used for wide purposes.

The present invention can be widely applied to either a microprocessor or a data processor which is constructed of a single microprocessor or a plurality of microprocessors.

Moreover, the microprocessor shown in FIG. 1 or FIG. 5 may be provided with a plurality of memory circuits, and a plurality of instructions may be shifted in advance from the external memory to the memory circuits built in the microprocessor. According to this modification, an instruction according to the signal to be fed to the external terminal PI may be selected from those plural instructions and may be executed.

While we have shown and described only one embodiment in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. A microprocessor which is formed on one semiconductor substrate and which executes instructions read out from a memory, comprising:
    an external signal terminal for receiving a signal which is provided from a floating-point processor in response to execution of a predetermined branch instruction read out from the memory, wherein the signal is an indicating signal for indicating whether or not a branch process is to be executed;
    external data terminals for coupling to a data bus which is coupled to the memory and to the floating-point processor; and
    a circuit which is responsive to the predetermined branch instruction and which tests the signal state of the external signal terminal to determine whether or not a branch process is to be executed, so that, when the same instructions are supplied from said memory to each of the microprocessor and the floating-point processor in parallel, the microprocessor executes a process represented by an instruction assigned thereto, but does not execute a process represented by an instruction which is not assigned thereto.

2. A microcomputer system comprising:
    a data bus;
    a first microprocessor coupled to the data bus and having an external signal input terminal;

a second microprocessor coupled to the data bus and having an external signal output terminal which is directly coupled to the external signal input terminal of the first microprocessor; and a memory coupled to the data bus for storing a plurality of instructions to be executed by the first microprocessor and the second microprocessor;

wherein at least one of the first microprocessor and the second microprocessor includes a first circuit which fetches instructions from said memory so that said first microprocessor and said second microprocessor receive the plurality of instructions from the memory in parallel, the first microprocessor executes a process represented by an instruction assigned thereto among said plurality of instructions, and the second microprocessor executes a process represented by an instruction assigned thereto among said plurality of instructions; and wherein the second microprocessor includes a second circuit which provides an indicating signal for indicating whether or not a branch operation is to be executed to said external signal output terminal, in response to execution of a predetermined condition branch instruction among the plurality of instructions, and wherein the first microprocessor includes means for determining a destination in the process to be reached by a branch operation in accordance with a condition of an indicating signal applied via said external signal input terminal.

3. A microprocessor system according to claim 2, wherein the first microprocessor is a master-processor formed on a chip and wherein the second microprocessor is a floating-point processor formed on a chip.

4. A microprocessor, formed on one semiconductor substrate, for sequentially executing a plurality of instructions read out from a memory, the microprocessor comprising:

a plurality of external address terminals for carrying a plurality of address signals;

a plurality of external data terminals for transmitting data between inside of the microprocessor and outside of the microprocessor;

an external signal terminal for sending a signal outside of the microprocessor; and a circuit which provides a signal indicating an execution of a branch operation to the external signal terminal in response to execution of a predetermined branch instruction among said plurality of instructions.

5. A microprocessor according to claim 4, wherein the microprocessor is a floating-point processor.

6. A microprocessor according to claim 4, wherein the predetermined branch instruction is a predetermined conditional branch instruction.

7. A microprocessor according to claim 6, wherein the predetermined conditional branch instruction includes a first portion defining an instruction code, a second portion defining branch condition data, and a third portion defining information for forming predetermined branch address signals when a condition represented by the branch condition data is satisfied; and wherein the microprocessor further includes a circuit which detects said first portion, and a circuit which forms the branch condition indicating signal on the basis of the branch condition data.

* * * * *